United States Patent [19]

Laffoon et al.

[11] 4,316,095
[45] Feb. 16, 1982

[54] ENGINE STARTING APPARATUS

[76] Inventors: Perry D. Laffoon, 21 Janice, Yukon, Okla. 73099; John A. Shannon, 525 N. Peniel, Oklahoma City, Okla. 73108

[21] Appl. No.: 69,799

[22] Filed: Aug. 27, 1979

[51] Int. Cl.³ .............................................. H02J 3/00
[52] U.S. Cl. ............................. 290/38 R; 290/36 R; 307/10 R
[58] Field of Search .................. 307/10 R; 290/36 R, 290/38 R

[56] References Cited

U.S. PATENT DOCUMENTS

| | | | |
|---|---|---|---|
| 3,824,404 | 7/1974 | Ghere | 307/10 R |
| 3,845,321 | 10/1974 | Santilli | 290/40 R |
| 3,953,740 | 4/1976 | Seiter, Jr. | 307/10 R |
| 4,074,145 | 2/1978 | Laffoon et al. | 290/40 R |

*Primary Examiner*—Stanley J. Witkowski
*Assistant Examiner*—Shelley Wade
*Attorney, Agent, or Firm*—Dunlap, Codding & McCarthy

[57] ABSTRACT

An electrical receptacle is connected to the alternator of an automotive vehicle to permit connection thereto of a power tool. A switching circuit senses the presence of an electric current through the tool to actuate relays in the switching circuit to cause the alternator to operate in a high voltage mode wherein the alternator provides power at a voltage level suitable for operating the tool at such times that the engine of the vehicle is operating. A unidirectional current path is provided between the battery of the vehicle and the receptacle to enable operation of the switching circuit at such times that the engine is not operating while isolating the battery from electrical power generated by the alternator in the high voltage mode of operation thereof. A first starting relay is actuated by closure of a set of normally open contacts of a relay in the switching circuit to supply power to the ignition system of the vehicle engine from the battery when the switching circuit is caused to operate by connecting a power tool to the receptacle and switching the power tool on at such times that the engine of the vehicle is not operating. A second starting relay is actuated by closure of another set of normally open contacts of a relay in the switching circuit to supply power to the starter motor of the vehicle engine so that the engine can be started by means of a power tool connected to the receptacle.

6 Claims, 1 Drawing Figure

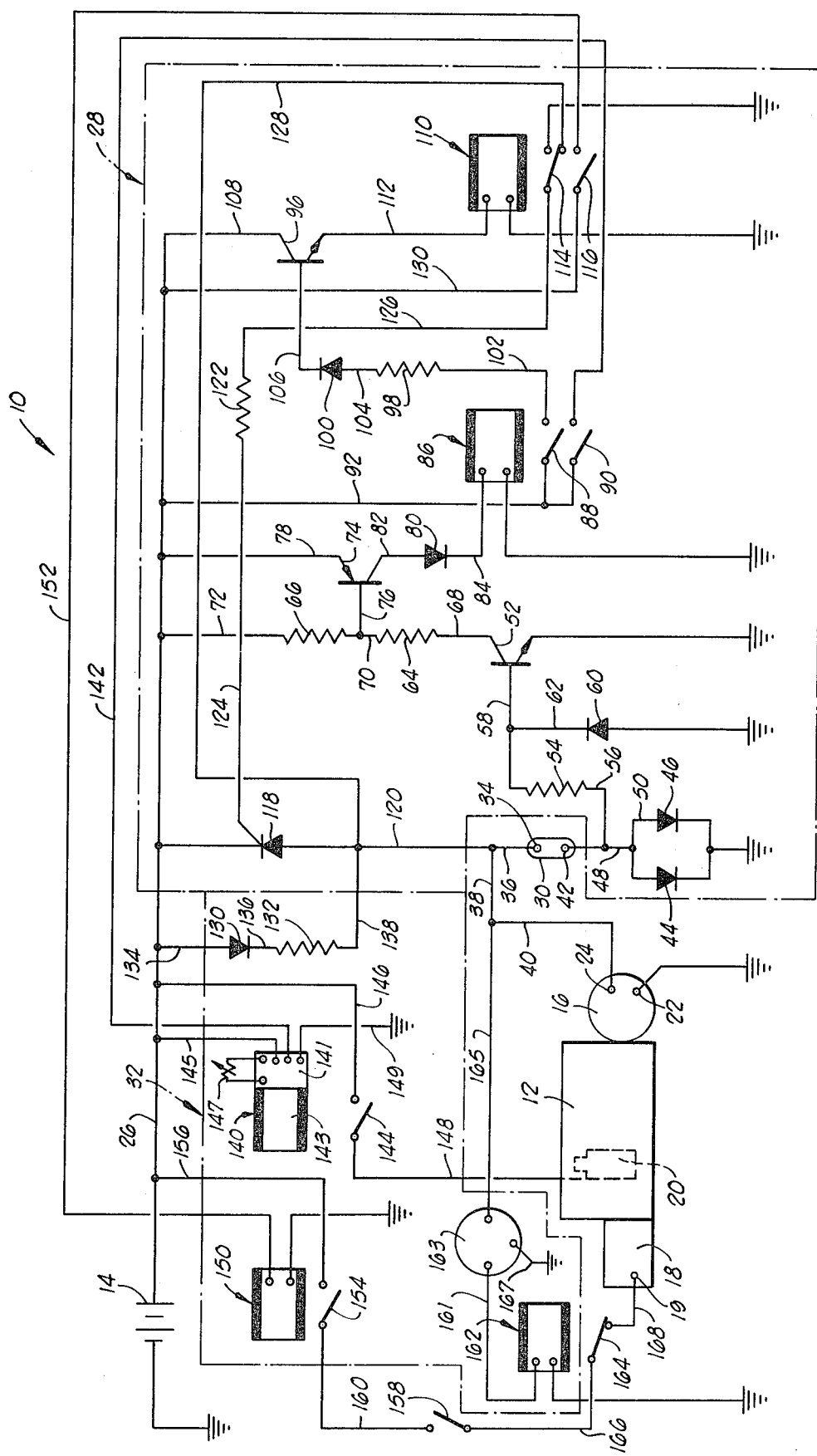

ENGINE STARTING APPARATUS

BACKGROUND OF THE INVENTION

1. Field of the Invention

The present invention relates generally to devices for starting an internal combustion engine and, more particularly, but not by way of limitation, to apparatus for starting the engine of an automotive vehicle equipped with a device for utilizing the electrical system of the vehicle as a source of electrical power for operating power tools and the like.

2. Brief Description of the Prior Art

The alternator of an automotive vehicle is capable of generating power at a voltage sufficient for the operation of power tools and the like designed to operate from power supplied by public utilities at a higher voltage than is normally found in an automotive vehicle electrical system. Advantage has been taken of this capability to make electric power, suitable for operation of such tools, available at job sites which are not serviced by public utilities. For example, U.S. Pat. No. 3,845,321, issued Oct. 29, 1974 to Santilli, discloses a device which can be engrafted on the electrical system of an automotive vehicle to permit power tools to be operated at any location accessible to the automotive vehicle. Similarly, Laffoon, et al., have disclosed an electrical power generating system which mates an automotive type alternator with a small gasoline engine in U.S. Pat. No. 4,074,145, issued Feb. 14, 1978. The electrical circuit of the power generating system disclosed by Laffoon can also be engrafted on an automotive vehicle electrical system so that the engine and alternator thereof provide electrical power for operating power tools in the manner of the Santilli device.

The purposes served by an alternator in carrying out its normal functions in an automotive vehicle electrical system differ from the purpose of operating a power tool at a voltage comparable to that supplied by public utilities and this difference is reflected in the design of devices which utilize alternators to operate power tools. In the system disclosed by Laffoon, the alternator is caused to operate either in a relatively low voltage mode suitable for charging a battery in the electrical system of a gasoline engine or in a relatively high voltage mode suitable for operating a power tool. In the low voltage mode, the field winding of the alternator is energized via a voltage regulator so that the voltage of the output terminal of the alternator is controlled to a value suitable for charging the battery and such output terminal is electrically connected to the battery for this purpose. In the high voltage mode, the output terminal of the alternator is electrically disconnected from the battery, for example, by grounding the gate of an SCR interposed between the alternator and the battery in order to prevent damage to the battery by the relatively high voltage output of the alternator. Means are also provided for energizing the field winding via the battery rather than via the voltage regulator and for increasing the speed of the engine driving the alternator so that the output voltage can be increased from the value normally utilized to maintain a charge on the battery. A solenoid connected to the throttle of the engine is utilized for increasing the engine speed. Where the engine and alternator are part of an automotive vehicle, the means for increasing the engine speed can utilize the vehicle engine vacuum source as disclosed by Santilli.

It will be clear that in many situations a power tool is utilized only intermittently and both Laffoon, et al., and Santilli disclose circuitry for automatically switching the alternator between the two modes of operation. Specifically, when a power tool is connected to either of the systems disclosed by Laffoon, et al., or Santilli and switched on, a current is passed through the tool, regardless of the mode of operation of the alternator, and this current is sensed by circuitry which causes the alternator to go to the high voltage mode, if it is not already in such mode, and remain in such mode during such time that the power tool remains in the switched on condition. Thus, at such times that the power tool is used, the alternator is in the high voltage mode to supply power for the tool. When use of the tool is discontinued, the switching circuitry causes the alternator to drop back to the low voltage mode, the engine speed to drop back to idle, and the alternator to be electrically connected to the battery for charging the battery.

While the art thus discloses devices which are suitable for providing electrical power for operation of tools at remote job sites, one problem has heretofore remained unsolved. In many applications, the device supplying electrical power will be located some distance from the location at which the power is to be used. Moreover, the use of a power tool will, in general, be phased into whatever task is being carried out so that the need for power may arise some time after the task is begun and it may arise only at infrequent intervals. Thus, in devices presently available, the gasoline engine, whether it be that of an automobile as disclosed by Santilli or a separate engine as disclosed by Laffoon, et al., must either be operated at times during which electrical power is not needed or a person carrying out a task requiring occasional use of a power tool must interrupt his work to start the gasoline engine which forms the primary power source for operating power tools.

SUMMARY OF THE INVENTION

The present invention solves the above problem by providing an apparatus for starting the engine utilized in an electrical power generating system incorporating an automotive type alternator when a power tool is connected to the system and switched on. The engine and alternator can be a part of an automotive vehicle or can be separate therefrom. In either case, it is contemplated that the engine will have an ignition system that can be energized to place the engine in a state wherein it will operate or de-energized to turn the engine off, a battery, and a starter motor which can be utilized to initiate operation of the engine via a current supplied thereto from the battery.

The engine starting apparatus includes a receptacle to which a power tool can be connected directly or via an extension cord or the like. The alternator is grounded and the output terminal of the alternator is connected to one terminal of the receptacle to supply electrical power to a power tool connected to the receptacle. The other terminal of the receptacle is grounded via a portion of a switching circuit of the engine starting apparatus to complete an electrical circuit including the alternator and the power tool. One terminal of the battery is similarly grounded and the other terminal thereof is connected to the terminal of the receptacle which is connected to the output terminal of the alternator so that an electrical current will be supplied to the power tool, either from the battery or the alternator, without regard to whether the alternator is in an operating state and without regard to which operating state the alternator, if operating, is in. The conducting path from the battery to the receptacle is unidirectional to prevent a high voltage developed at the output terminal of the alternator at such times that the alternator drives the power tool from being transmitted to the battery so as to cause damage to the battery.

The switching circuit can be a portion of a circuit which can be engrafted upon a power generating system such as that disclosed by Laffoon, et al., U.S. Pat. No. 4,074,145, or Santilli, U.S. Pat. No. 3,845,321, to switch the alternator between high and low voltage modes of operation and the switching circuit includes at least one switching relay having at least one set of normally open contacts and means for actuating the switching relays in response to an electrical current through the portion of the switching circuit interposed between the receptacle and the alternator ground; that is, in response to a current through the power tool. A first starting relay, connected to the battery terminals via a set of normally open contacts of a switching relay, has a set of normally open contacts interposed between the engine ignition system and the battery so that, when the switching relays are actuated by turning on a power tool connected to the apparatus, the engine ignition system is energized to permit operation thereof. A second starting relay, connected to the battery terminals via a set of normally open contacts of a switching relay, has a set of normally open contacts interposed between the engine starter motor and the battery so that, when the switching relays are actuated by passing a current through a tool connected to the receptacle, the starter motor is operated to initiate operation of the engine. Means are provided for discontinuing the operation of the starter motor once the engine is operating.

An object of the present invention is to permit an automotive vehicle engine having a device for supplying power for operating power tools to be started from a remote location wherein such power tools are used.

Another object of the invention is to permit the starting of such engine, without return of the operator to the engine, on an intermittent basis as may be required by the need for using power tools.

Other objects, advantages and features of the present invention will become clear from the following detailed description of the preferred embodiment of the invention when read in conjunction with the drawings and the appended claims.

BRIEF DESCRIPTION OF THE DRAWING

The drawing is a schematic diagram of the circuit of the engine starting apparatus.

DESCRIPTION OF THE PREFERRED EMBODIMENT

Referring now to the drawing, shown therein and designated by the general reference numeral 10 is a schematic circuit diagram for the engine starting apparatus of the present invention. The apparatus 10 is utilized to start an engine 12 having an electrical system including a battery 14, an alternator 16, a starter motor 18 and an ignition system 20 schematically represented in the drawing as an ignition coil. The engine 12 and electrical system thereof are conventional and the engine can have means (not shown) permitting the ignition system 20 and starter motor 18 to be manually energized for starting the engine 12. The alternator 16 is driven by the engine 12 in a conventional manner and has a ground terminal 22 which can be grounded to the supporting structure for the engine 12; for example, the ground terminal 22 can be connected to the chassis of a vehicle wherein the engine 12 is mounted. Similarly, one terminal of the battery 14 is grounded and the starter motor 18 is grounded so that the starter motor 18 can be operated by connecting an input terminal 19 thereof to the ungrounded terminal of the battery 14. (For purposes of the present discussion, it will be considered herein that the negative terminal or cathode of the battery 14 is the grounded terminal. As will be clear to those skilled in the art, the anode of the battery can be the grounded terminal and it will be clear that semiconductor components of the engine starting apparatus 10 will, in some cases, be connected differently than as will be described below and, in other cases, will differ from the description of such components to be given below in accordance with known principles of circuit design. For example, should the anode of the battery 14 be grounded, PNP transistors would be used in place of the NPN transistors in the apparatus to be described below and vice versa. Similarly, diodes would be connected in a reverse manner to the manner to be described below should the anode of the battery 14 be grounded.) The alternator 16 has an output terminal 24 which is connected to the engine starting apparatus 10 as will be described below. Various components of the engine starting apparatus 10 are connected to the anode of the battery 14 and a bus 26 has been shown connected to the battery 14 in the drawing to simplify the description of the connection of such components to the battery 14.

Turning now to the engine starting apparatus 10, the apparatus 10 includes a switching circuit, generally designated 28, and the switching circuit 28 can be utilized both for starting the engine 12 and for switching the alternator 16 between high voltage and low voltage modes of operation as has been described in the aforementioned U.S. Pat. No. 4,074,145, such patent being herein incorporated by reference. In the preferred form of the present invention, the switching circuit 28 is constructed in the same manner as a portion of the circuit disclosed in U.S. Pat. No. 4,074,145 and additional circuitry, not shown in the drawing, will be provided as in U.S. Pat. No. 4,074,145 for providing current to the field winding terminal (not shown) of the alternator 16 and for increasing the speed of the engine 12 where the alternator 16 is utilized for providing electrical power for the operation of the power tool as will be described below.

The engine starting apparatus 10 comprises, in addition to the switching circuit 28, a receptacle 30 to which a power tool can be connected either directly or via an extension cord or the like and a starting circuit, generally designated 32 in the diagram. A first terminal 34 of the receptacle 30 is connected to the output terminal 24 of the alternator 16 via conductors 36, 38 and 40 so that the alternator 16 can be utilized as a source of electrical power for the tool in the manner described in the aforementioned U.S. Pat. No. 4,074,145. To complete the electrical circuit between the power tool and the alternator 16, the second terminal 42 of the receptacle 30 is grounded via diodes 44, 46. Specifically, the anodes of diodes 44, 46 are connected to the terminal 42 via conductors 48, 50 and the cathodes of the diodes 44, 46 are grounded when the cathode of the battery 14 is the grounded terminal thereof. (The purpose for using two diodes connected in parallel as has been indicated in the drawing rather than a single diode to ground the second terminal 42 of the receptacle 30 is to permit the use of inexpensive automotive type diodes in the starting apparatus 10 rather than a more expensive single diode having a higher current rating as has been discussed in the aforementioned U.S. Pat. No. 4,074,145.)

The diodes 44, 46 form a portion of the switching circuit 28 and provide a means for sensing a current through an electrical load connected to the receptacle 30 as has been described in the aforementioned U.S. Pat. No. 4,074,145. Specifically, the diodes 44, 46 are forward biased with respect to a current supplied to the load connected to the receptacle 30 so that a small voltage relative to ground will exist at the anodes of the diodes 44, 46 whenever a current is passed through such a load. This voltage is transmitted to the base of an NPN transistor 52 via a resistor 54 and conductors 56 and 58. The cathode of a diode 60 can be connected to the conductor 58, connecting the resistor 54 to the transistor 52 via a conductor 62 and the anode of diode 60 can be grounded to eliminate voltage spikes which might be transmitted to the base of transistor 52 when a load connected to the receptacle 30 is turned off.

The emitter of transistor 52 is grounded and the collector thereof is connected to the bus 26 via series resistors 64 and 66 and conductors 68, 70 and 72 so that an electrical current is provided to the collector of transistor 52 from the anode of battery 14. The base of a PNP transistor 74 is connected, via conductor 76, to the conductor 70 connecting the resistor 64 to the resistor 66 and the emitter of transistor 74 is connected to the bus 26 via a conductor 78. The collector of transistor 74 is connected to the anode of a diode 80 via a conductor 82 and the cathode of diode 80 is connected via conductor 84 to one terminal of the coil of a first switching relay 86. The other terminal of the coil of relay 86 is grounded. The relay 86 has a plurality of sets of contacts including two sets of normally open contacts 88 and 90. (Other sets of contacts, not shown in the drawing, are utilized for purposes described in the aforementioned U.S. Pat. No. 4,074,145.) One side of each of the sets of contacts 88, 90 is connected to the bus 26 via a conductor 92. The set of contacts 88 is utilized to provide a base current to an NPN transistor 96 when relay 86 is actuated to close the sets of contacts 88, 90. For this purpose, the set of contacts 88 is connected via resistor 98, diode 100 and conductors 102, 104 and 106 to the base of transistor 96. The diode 100 is forward biased with respect to the base-emitter junction of the transistor 96 and is used for voltage spike suppression as is the diode 80. The collector of transistor 96 is connected to the bus 26 via a conductor 108 and the emitter thereof is connected to one terminal of the coil of a second switching relay 110 via a conductor 112. The other terminal of relay 110 is grounded. Relay 110 has a plurality of sets of contacts including a set of double throw contacts 114 and a set of normally open contacts 116. (Other sets of contacts, not shown in the drawing, are utilized for purposes described in the aforementioned U.S. Pat. No. 4,074,145.) The switching circuit 28 includes an SCR 118, the anode of which is connected to the output terminal 24 of the alternator 16 via conductor 120 and conductors 38 and 40, and the cathode of which is connected to the bus 26 so that the alternator 16 can be utilized to charge the battery 14 in a conducting state of the SCR 118. The gate of SCR 118 is connected to the lever arm of the set of double throw contacts 114 of relay 110 via a resistor 122 and conductors 124, 126 and the normally closed member of the set of contacts 114 is connected to the output terminal 24 of alternator 16 via a conductor 128 and conductors 120, 38 and 40. The normally open member of the set of contacts 114 is grounded. The set of normally open contacts 116 of relay 110 is connected to the bus 26 via a conductor 130 and is connected to the starting circuit 32 in a manner to be described below and for a purpose to be described below.

As noted above, the switching circuit 28 is utilized both for starting the engine 12 and for switching the alternator 16 between high voltage and low voltage modes of operation when the alternator is being driven by the engine 12. It will be useful to briefly describe the operation of the switching circuit 28 for carrying out the latter function prior to considering the construction and operation of the starting circuit 32.

When the engine 12 is operating, an electromotive force is generated by the alternator 16 and this electromotive force is transmitted to the first terminal 34 of the receptacle 30 via the above described connection of the first terminal 34 to the output terminal 24 of the alternator 16. Should a power tool or the like be connected to the receptacle 30 and turned on, the tool will transmit a current through the diodes 44 and 46 so that the anodes thereof will be at a potential slightly higher than ground potential. If the tool is turned off, the current will cease and the anodes of diodes 44, 46 will return to ground potential. In this manner, the diodes 44, 46 sense a current through the tool connected to the receptacle 30 so that the switching circuit 28 can be actuated to actuate relays 86, 110 in response to turning the tool on. Specifically, turning the tool on initiates the following events. The potential at the anodes of diodes 44, 46 is transmitted to the base of transistor 52 to forward bias the base emitter junction thereof. The resulting collector current of transistor 52 will result in a voltage drop across resistor 66 and this voltage drop forward biases the base emitter junction of transistor 74 so that transistor 74 passes a current through the coil of relay 86. The current through the coil of relay 86 closes the set of normally open contacts 88 to transmit a base current to transistor 96 to turn transistor 96 on. When transistor 96 is turned on, the current therethrough passes through the coil of the second switching relay 110 to actuate the second switching relay 110. Conversely, when the tool is turned off, the base of transistor 52 is grounded via diodes 44 and 46 so that transistor 52 is turned off. Accordingly, no voltage drop will appear across resistor 66 so that the base emitter junction of PNP transistor 74 is no longer forward biased with the result that transistor 74 turns off to deactuate the first switching relay 86. When the first switching relay 86 is deactuated, the set of contacts 88 thereof returns to the normally open state to remove the forward bias of the base emitter junction of transistor 96, whereby the second switching relay 110 is deactuated. Thus, so long as a source of current is supplied to the first terminal 34 of receptacle 30, the turning on of a tool connected to the receptacle 30 will actuate the relays 86 and 110 and the turning off of such tool will deactuate the relays 86 and 110.

Since it is contemplated that the alternator 16 will be utilized to provide relatively high voltage sufficient to operate a power tool connected to the receptacle 30, it is contemplated that the present invention will be utilized in conjunction with circuitry, such as has been disclosed in the aforementioned U.S. Pat. No. 4,074,145, which will increase the voltage at the output terminal 24 of the alternator 16 when a power tool is connected to the receptacle 30 and turned on. (As previously noted, the relays 86 and 110 can be provided with additional sets of contacts for this purpose as has been disclosed in the aforementioned U.S. Pat. No. 4,074,145.) In order to prevent the high voltage generated by the alternator 16 during the operation of a power tool connected to the receptacle 30 from reaching and possibly damaging the battery 14 and components of the switching circuit 28, the SCR 118, which connects the bus 26 to the output terminal 24 of the alternator 16 is caused to be in a nonconducting state at such times that the second switching relay 110 is actuated. Specifically, the lever arm of the set of double throw contacts 114, such lever arm being connected to the gate of SCR 118, makes with the grounded member of such set of contacts to place the SCR 118 in a nonconducting state when the relay 110 is actuated. When the power tool is turned off so that the alternator 16 goes to the low voltage mode of operation, as described in the aforementioned U.S. Pat. No. 4,074,145, the normally closed member of the set of double throw contacts 114 makes with the lever arm of the set of contacts 114 to transmit a signal to the gate of SCR 118 from the output terminal 24 of alternator 16 via the connection of the lever arm of the set of contacts 114 to the gate of SCR 118 and the connection of the normally closed member of the set of contacts 114 to the output terminal 24 of alternator 16 as described above. Thus, when the alternator 16 operates in the low voltage mode thereof, SCR 118 provides a conducting path to bus 26 and thence to the anode of battery 14 to charge the battery 14.

Turning now to the starting circuit 32, the starting circuit 32 provides a conducting path between the bus 26 and the first terminal 34 of the receptacle 30 so that the switching circuit 28 can be actuated at such times that the engine 12 is not operating to drive the alternator 16. Since the output terminal 24 of the alternator 16 is also connected to the first terminal 34, the conducting path provided by the starting circuit 32 is made unidirectional, from the bus 26 to the terminal 34, so that the conducting path will not transmit a high voltage from the alternator to the bus 26 with possible consequent damage to the battery 14 and components of the switching circuit 28 when the alternator is operated at a voltage suitable for operating a power tool. Specifically, the conducting path is provided by a diode 130 and resistor 132 connected in series between the bus 26 and the first terminal 34 of receptacle 30. Where the cathode of battery 14 is the grounded terminal thereof, the anode of diode 130 is connected to bus 26 via a conductor 134 and the cathode thereof is connected to resistor 132 via conductor 136. A conductor 138 and conductors 120 and 36 connect resistor 132 to the first terminal 34 of receptacle 30.

The starting circuit further comprises a first starting relay 140 and one input terminal of relay 140 is connected to the set of normally open contacts 90 of the first switching relay 86 via a conductor 142. The other input terminal of relay 140 is grounded via conductor 149. While the first starting relay 140 can be a conventional relay, in which case the input terminals of relay 140 are the terminals of the coil thereof, it is preferable for reasons to be discussed below for the relay 140 to be a time delay relay of the delay-on-release type. Such relays, for example, the series CG relays manufactured by Potter and Brumfield, Princeton, Indiana, are well known and need be only briefly described herein. Such relays include a timing circuit, schematically indicated for the relay 140 at 141 in the drawing and electrical power is supplied to the timing circuit 141 via a conductor indicated at 145 in the drawings, such conductor 145 connecting the timing circuit 141 to the bus 26. The timing circuit has a control switch which can be closed to actuate an internal relay, indicated at 143 in the drawings, and opened to initiate a timing period during which relay 143 remains activated. At the end of the timing period, the internal relay deactuates. When relay 140 is a relay of this type, the input terminal thereof which is connected to the set of contacts 90 of relay 86 is connected to the control switch such that the above described actuation cycle of the internal relay 143 occurs each time the set of contacts 90 is closed. The timing period during which relay 143 remains actuated after the set of contacts 90 is opened is adjustable by a resistance connected to timing circuit 141 and a variable resistor 147 is provided in the starting circuit 32 to permit the user of the starting apparatus 10 to select the time during which relay 147 remains actuated after the set of contacts 90 is opened. The internal relay 143 has a set of normally open contacts 144 which is connected to bus 26 via conductor 146 and is connected to the ignition system 20 of engine 12 via conductor 148 so as to connect the ignition system 20 to battery 14 when the set of contacts 144 is closed. Thus, the ignition system 20 can be placed in a state wherein the engine 12 is operable by actuating relay 143 to close the set of contacts 144 and can be turned off by opening the set of contacts 144 when other means of energizing the ignition system 20 have not been utilized.

The starting circuit 32 further comprises a second starting relay 150 and one terminal of the coil of relay 150 is connected to the set of normally open contacts 116 of the second switching relay 110 via a conductor 152. The other terminal of the coil of relay 150 is grounded so that, when relay 110 is actuated to close the set of contacts 116, a current is passed from the battery 14 through bus 26, conductor 130, the set of contacts 116, and conductor 152 to the coil of relay 150 to actuate relay 150. Relay 150 has a set of normally open contacts 154 which is connected to bus 26 via a conductor 156 and to the starter motor 18 to provide a current thereto for starting the engine 12 as will now be described. A drop-out relay 162 is included in the starting circuit 32 and one terminal of the coil of relay 162 is grounded. The other terminal of the coil of relay 162 is connected to the output terminal of a conventional solid state voltage regulator 163 via a conductor 161 and the input terminal of the voltage regulator 163 is connected to the output terminal 24 of alternator 16 via a conductor 165 and the conductor 40. The ground terminal of voltage regulator 163 is grounded via conductor 167. Relay 162 is selected so as to require that an actuation voltage greater than the battery voltage be impressed across the coil thereof to actuate relay 162 in order to prevent actuation of relay 162 by the battery 14. That is, relay 162 is to be actuated only by the alternator 16 and only at such times that alternator 16 operates in the high voltage mode thereof. The voltage regulator 163 is selected to provide a suitable voltage to the coil of relay 162 at such times that the alternator 16 operates in the high voltage mode. The drop-out relay 162 has a set of normally closed contacts 164.

A contemplated usage of the present invention is in conjunction with the engine of an automotive vehicle and, where such usage is made of the present invention, it is useful to exploit features often found in electrical systems of automotive vehicles in connecting the set of contacts 154 to the starter motor 18. In particular, it is conventional for an automotive vehicle to include a neutral safety switch to prevent the starting of the engine at such times that the vehicle is in gear. Should this feature be included in the vehicle, the set of contacts 154 of relay 150 is connected to the neutral safety switch, which has been designated in the drawing by the numeral 158, via a conductor 160. The set of contacts 164 of dropout relay 162 are then interposed between starter motor 18 and the neutral safety switch 158. That is, the neutral safety switch 158 is connected to the input terminal 19 of the starter motor 18 via conductors 166 and 168 and the set of contacts 164. Where the vehicle does not have a neutral safety switch or where the present invention is utilized with a power generating system not forming a part of an automotive vehicle, conductor 160, connected to the set of normally open contacts 154 of second starting relay 150, is connected directly to the set of contacts 164 of relay 162.

Operation of the Preferred Embodiment

The present invention permits the engine 12 to be located in a work area as may be convenient for purposes not associated with the location wherein a task requiring the use of power tools operated by the alternator 16, is to be performed. For example, where the engine 12 is a part of an automotive vehicle, it can be convenient in some circumstances to leave the vehicle on the shoulder of a roadway some distance from the site at which work is to be performed. In such case, the person using the alternator 16 as a means for powering a power tool or the like can connect an extension cord to receptacle 30 and move to the work area with the tools he will need to perform the task at hand. The extension cord will be played out as he moves to the work area and the engine 12 will be left in a nonoperative state. Of course, where the engine 12 is a part of an automotive vehicle, the user of the present invention will leave the vehicle in neutral or park so that the vehicle will not move when the engine 12 is started by means of the present invention. Upon reaching the work site, the user of the present invention can commence whatever task is to be performed. At such time that a need arises to use a power tool, such power tool is connected either directly, or via an extension cord as described above, to the receptacle 30 and switched on. When the power tool is switched on, a current is passed from the battery 14 through bus 26, diode 130, resistor 132, conductors 134, 138, 120 and 34 to the first terminal 34 of the receptacle 30. This current passes through the tool and thence via the diodes 44 and 46 to ground. The potential at the anodes of diodes 44, 46 turns on transistor 52 to actuate the switching relays 86 and 110 in the sequence and in the manner that has been described above. That is, when a current is passed through the tool connected to the receptacle 30, the first switching relay 86 is actuated by the conduction of a current by transistors 52 and 74. When the first switching relay 86 is actuated, the set of normally open contacts 90 thereof is closed to pass a current from the battery 14 via bus 26, conductor 92, the set of contacts 90 and conductor 142 to the timing circuit 141 of the first starting relay 140.

Accordingly, relay 140 is actuated to close the set of normally open contacts 144 so as to supply electrical power from the bus 26 to the ignition system 20 of the engine 12 via conductors 146 and 148 and the set of normally open contacts 144. The actuation of the first switching relay 86 also passes a current from the battery 14 via bus 26, conductor 92, the set of normally open contacts 88, conductors 102, 104 and 106 and resistor 98 and diode 100 to the base of transistor 96 so that transistor 96 passes a current from the battery 14, through bus 26 and conductors 108 and 112, to the coil of the second switching relay 110 whereby the second switching relay 110 is actuated to close the set of normally open contacts 116. When the set of normally open contacts 116 is closed, a current is passed from the battery 14 through bus 26, conductors 130 and 152, and the set of normally open contacts 116 to the coil of the second starting relay 150 to actuate the second starting relay 150. When the second starting relay 150 is actuated, the set of normally open contacts 154 thereof passes a current from the battery 14 through bus 26 and conductors 156 and 160, through the set of normally open contacts 164 of the drop out relay 162, and, if provided, the neutral safety switch 158, to the input terminal 19 of the starter motor 18. Since power has been supplied to the ignition system 20 by the actuation of the first switching relay 86 and the first starting relay 140, the supply of a current to the starter motor 18 via the second switching relay 110 and the second starting relay 150 actuates the starter motor 18 to initiate the operation of the engine 12. At such time that engine 12 commences operation, alternator 16 will provide electrical power at the output terminal 24 thereof. Since the switching relays 86 and 110 are in the actuated state thereof, the alternator 16 will operate in the high voltage mode as noted above so that the voltage at the output terminal thereof, transmitted via conductors 40, 38 and 36 to the tool connected to the receptacle 30, will be sufficient to operate such power tool. As noted above, such voltage at the input terminal of voltage regulator 163 will also be sufficient to cause the voltage regulator 163 to actuate drop-out relay 162. Accordingly, once engine 12 commences operation, the set of contacts 164 of relay 162 opens to discontinue operation of starter motor 18.

When use of the power tool is discontinued, the switching off of the tool grounds the base of transistor 52 to deactuate the switching relays 86 and 110 so that, as noted above, the alternator 16 returns to the low voltage mode of operation so long as the engine 12 continues to operate. Such operation is caused to continue by utilizing a delay-on-release type time delay relay for the first starting relay 140. That is, when the first switching relay 86 is deactuated to open the set of normally open contacts 90 thereof, the set of normally open contacts 144 thereof remains closed for a period of time selected by the user of the apparatus 10 via the resistor 147 to provide power to the ignition system 20. Thus, the engine 12 continues to operate for a period of time after a power tool connected to the receptacle 30 is turned off. During such time, as noted above, the alternator 16 operates in the low voltage mode and SCR 118 is turned on, as described above, so that electrical power generated by the alternator 16 is utilized to charge the battery 14. (It will be noted that the set of contacts 164 of relay 162 close when the alternator 16 operates in the low voltage mode. However, in such mode of operation of the alternator 16, the set of contacts 154 of relay 150 is opened via the opening of the set of contacts 116 of relay 110. Accordingly, the starter motor 18 will not operate in either mode of operation of the alternator 16 when the engine 12 is operating.)

Should, within the preselected time period for deactuation of internal relay 143 of the first starting relay 140, the power tool connected to receptacle 30 again be switched on, the switching relays 86 and 110 are actuated as has been described above so that the alternator 16 is operated in the high voltage mode suitable for operating the power tool 30. In such case, since the engine 12 has continued to operate during the intervening period between uses, there will be no need for restarting the engine 12. Should the time interval between successive uses of a tool connected to receptacle 30 exceed the preselected delay time for deactuation of internal relay 143 of the first starting relay 140, the internal relay 143 of first starting relay 140 will be deactuated when such delay time expires to remove the supply of electrical power to the ignition system 20 of engine 12 so that the operation of engine 12 is discontinued. With the cessation of operation of the engine 12, the generation of electrical power by the alternator 16 is discontinued to deactuate the dropout relay 162 so that the set of normally closed contacts 164 thereof again closes. Further use of a tool connected to the receptacle 30 will then again initiate operation of the engine 12 as has been described above.

It is clear that the present invention is well adapted to carry out the objects and obtain the ends and advantages mentioned as well as those inherent therein. While a presently preferred embodiment of the invention has been described for purposes of the disclosure, numerous changes may be made which readily suggest themselves to those skilled in the art and which are encompassed in the spirit of the invention disclosed and as defined in the appended claims.

What is claimed is:

1. An apparatus for starting an internal combustion engine having an electrical system including an ignition system, a battery and an alternator driven by the engine to maintain the battery in a charged state and having a starter motor connectable to the battery for starting the engine at such times that electrical power is supplied to the ignition system of the engine, comprising:
   a receptacle for receiving an electrical load, said receptacle having a first terminal connected to the output terminal of the alternator and a second terminal connected to an alternator ground;
   means for providing a unidirectional conducting path from one terminal of the battery to the first terminal of the receptacle, the conduction direction of said path opposing an electrical current from the output terminal of the alternator to the battery, and the other terminal of the battery being connected to the alternator ground;
   a switching circuit having a portion interposed between the second terminal of the receptacle and the alternator ground, whereby an electrical load connected between the terminals of the receptacle will complete an electrical circuit with the battery via the means for providing a unidirectional current path, comprising:
      at least one switching relay, each switching relay having at least one set of normally open contacts; and
      means for actuating the swiching relays to close the normally open contacts thereof in response to a current through an electrical load connected between the terminals of the receptacle;
   means connected to one set of normally open contacts of one of the switching relays, for connecting the ignition system to the battery so as to enable the engine to operate in a closed condition of said one set of normally open contacts; and
   means connected to one other set of normally open contacts of a switching relay for connecting the starter motor to the battery so as to operate the starter motor in response to closure of said one other set of normally open contacts at such time that the engine is in a non-operating condition.

2. The apparatus of claim 1 wherein the starter motor is connected to the alternator ground and has an input terminal connectable to the battery for operating the starter motor; wherein the alternator is operable in a high voltage mode wherein the output voltage thereof is higher than the battery voltage, and, wherein the means for connecting the starter motor to the battery comprises:
   a starting relay having the coil thereof connected across the battery terminals via said one other set of normally open contacts of a switching relay;
   a drop-out relay having one terminal of the coil thereof connected to the alternator ground and having a set of normally closed contacts connected between the set of normally open contacts of said starting relay and the input terminal of the starter motor, wherein the actuation voltage of the dropout relay is greater than the battery voltage; and
   means, connected between the output terminal of the alternator and the other terminal of the coil of the drop-out relay, for providing the requisite drop-out relay actuation voltage in the high voltage mode of operation of the alternator.

3. The apparatus of claim 1 wherein the means for providing a unidirectional current path comprises a semiconductor diode connected between the battery and the receptacle.

4. The apparatus of claim 3 wherein the means for providing a unidirectional current path further comprises a resistor in series with said diode.

5. The apparatus of claim 1, 2, 3, or 4 wherein the switching circuit is characterized as having at least two switching relays, at least one of said two switching relays having at least two sets of normally open contacts; wherein the means for actuating the switching relays is further characterized as comprising:
   means for actuating a first one of said two switching relays, having at least two sets of normally open contacts, in response to a current through a load connected to the terminals at the receptacle; and
   means for energizing the second one of said two switching relays in response to closure of one set of normally open contacts of the first one of said two switching relays; and
wherein the set of normally open contacts of a switching relay connected to the means for connecting the ignition system to the battery is a set of contacts of the first one of said two switching relays and the set of normally open contacts connected to the means for connecting the starter motor to the battery is a set of contacts of the second one of said two switching relays.

6. The apparatus of claim 5 wherein the means for connecting the ignition system to the battery is characterized as being a delay-on-release type time delay relay.

* * * * *

UNITED STATES PATENT OFFICE
CERTIFICATE OF CORRECTION

Patent No. 4,316,095     Dated February 16, 1982

Inventor(s) Perry D. Laffoon, John A. Shannon

It is certified that error appears in the above-identified patent and that said Letters Patent are hereby corrected as shown below:

The title, each occurrence, should read --Engine Starting Apparatus for Auxiliary Loads--.

Column 11, Line 67, delete the word "swiching" and insert the word --switching--.

Signed and Sealed this

Twentieth Day of July 1982

[SEAL]

Attest:

GERALD J. MOSSINGHOFF

Attesting Officer     Commissioner of Patents and Trademarks